United States Patent
Vaello Paños et al.

(10) Patent No.: US 11,067,691 B2
(45) Date of Patent: Jul. 20, 2021

(54) ACQUISITION OF DISTANCE DATA WITH OPTICAL RANGING SYSTEMS

(71) Applicant: ams Sensors Singapore Pte. Ltd., Singapore (SG)

(72) Inventors: Miguel Bruno Vaello Paños, Zurich (CH); Cassian Strässle, Wädenswil (CH); Bryant Hansen, Zurich (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 351 days.

(21) Appl. No.: 15/775,490

(22) PCT Filed: Nov. 14, 2016

(86) PCT No.: PCT/SG2016/050563
§ 371 (c)(1),
(2) Date: May 11, 2018

(87) PCT Pub. No.: WO2017/082830
PCT Pub. Date: May 18, 2017

(65) Prior Publication Data
US 2018/0348371 A1 Dec. 6, 2018

Related U.S. Application Data

(60) Provisional application No. 62/254,801, filed on Nov. 13, 2015.

(51) Int. Cl.
*G01S 17/08* (2006.01)
*G01S 7/4914* (2020.01)
(Continued)

(52) U.S. Cl.
CPC .............. *G01S 17/32* (2013.01); *G01C 3/00* (2013.01); *G01S 7/493* (2013.01); *G01S 7/4914* (2013.01); *G01S 17/08* (2013.01)

(58) Field of Classification Search
CPC .................. G01S 17/08; G01S 17/32
See application file for complete search history.

(56) References Cited

U.S. PATENT DOCUMENTS 7,462,808 B2    12/2008   Lustenberger et al.
7,586,077 B2     9/2009   Lehmann et al.
(Continued)

FOREIGN PATENT DOCUMENTS

CN    104730536 B    5/2018
TW    201237457 A    9/2012
TW    201312144 A    3/2013

OTHER PUBLICATIONS

ISA/AU, International Search Report for PCT/SG2016/050563 (dated Dec. 9, 2016).

(Continued)

*Primary Examiner* — Eric L Bolda
(74) *Attorney, Agent, or Firm* — Michael Best and Friedrich LLP (57) ABSTRACT

This disclosure is directed to methods for acquiring distance data using optical ranging systems. Optical ranging systems include one or more reference pixels and one or more object pixels. The methods employ operations for optimizing reference-pixel integration times and object-pixel integration times such that accurate distance data can be collected.

19 Claims, 3 Drawing Sheets

(51) Int. Cl.
    *G01S 7/493*     (2006.01)
    *G01S 17/32*     (2020.01)
    *G01C 3/00*      (2006.01)

(56)                    References Cited

U.S. PATENT DOCUMENTS

| | | |
|---|---|---|
| 8,760,549 B2 | 6/2014 | Lehmann et al. |
| 8,803,967 B2 | 8/2014 | Oggier et al. |
| 8,964,028 B2 | 2/2015 | Oggier |
| 9,140,795 B2 | 9/2015 | Lehmann et al. |
| 9,410,800 B1 | 8/2016 | Oggier et al. |
| 2013/0307698 A1 | 11/2013 | Forster |
| 2014/0152813 A1 | 6/2014 | Wilks et al. |
| 2017/0090018 A1* | 3/2017 | Buettgen ............... G01S 7/4813 |
| 2018/0329043 A1* | 11/2018 | Hansen ................ G01S 7/4918 |

OTHER PUBLICATIONS

Seiter, J. et al., "Correction of the Temperature Induced Error of the Illumination Source in a Time-of-Flight Distance Measurement Setup," Sensors Applications Symposium (SAS), 2013 IEEE, Feb. 19-21, 2013, p. 84-87.
Office Action issued from the Taiwan Patent Office for related Application No. 10921206830 dated Dec. 11, 2020 (8 Pages including Statement of Relevance).

\* cited by examiner

ACQUISITION OF DISTANCE DATA WITH OPTICAL RANGING SYSTEMS

FIELD OF THE DISCLOSURE

The present disclosure relates to methods for acquiring distance data with optical ranging systems.

BACKGROUND

Optical ranging systems can collect distance data of one or more objects in a scene. Distance data can include, for example, the distance between the one or more objects and the optical ranging system. Optical ranging systems typically contain an illumination source and a multitude of pixels, such as demodulation pixels, including at least one reference pixel and a least one object pixel. At least one object pixel together with at least one reference pixel can be operable to collect incident light and can generate distance data.

Optical ranging systems with such pixels typically direct light from the illumination source onto the one or more objects in a scene. Some of this light reflects from the one or more objects and is directed to the at least one object pixel. Only a portion of this light, however, is incident on the pixels. Further, that portion may vary from object to object as the portion of light reflected and incident on the pixels is dependent on the one or more objects' reflectivity and distance from the optical ranging system. For example, objects that are closer to the optical ranging system can reflect more light back to the plurality of pixels than objects that are further away. Consequently, the time over which an object pixel collects light and converts it to electrical charges, the object-pixel integration time, can vary considerably for different objects at different distances to generate a signal with an acceptable signal-to-noise ratio.

Moreover, optical ranging systems with such pixels also typically direct light from the illumination source onto the one or more reference pixels while directing light simultaneously from the illumination source onto the one or more objects in a scene. Such direct sampling of the light directed from the illumination source often is necessary to produce a reference signal which is necessary to generate distance data via the time-of-flight technique. The time over which the reference pixel collects light and converts it to electrical charges, the reference-pixel integration time, can be independent of objects in a scene and their distances from the optical ranging system. Consequently, the object-pixel integration time necessary to produce an acceptable signal-to-noise ratio and reference-pixel integration time necessary to produce an acceptable signal-to-noise ratio can vary considerably. For example, in some instances an object-pixel integration time sufficient to produce an acceptable signal-to-noise ratio may be of one duration, while a reference-pixel integration time of the same duration may oversaturate the reference pixel with charge carriers.

Nevertheless, both reference-pixel and object-pixel integration times commencing simultaneously can provide advantages in some instances. Likewise, both reference-pixel and object-pixel integration times having an equal duration and commencing simultaneously can, in some instances, provide further advantages; for examples, operational speeds can be increased and losses can be reduced.

Therefore, it can be a challenge to determine and implement object-pixel and reference-pixel integration times which produce acceptable signal-to-noise ratios, which commence simultaneously, and in some instances, have the same duration.

SUMMARY

This disclosure describes methods for determining optimal reference-pixel and object pixel integration times, and collecting distance data with an optical ranging system. In one aspect, for example, a method for collecting distance data includes initializing the optical ranging system, where the optical ranging system includes at least one reference pixel operable to convert incident light to electrical charges, and at least one object pixel operable to convert incident light to electrical charges. The method further includes directing incident light to the at least one reference pixel and the at least one object pixel, and collecting electrical charges with the at least one reference pixel over an initial reference-pixel integration time, and collecting electrical charges with the at least one object pixel over an initial object-pixel integration time. The method further includes correlating the electrical charges collected with the at least one reference pixel over the initial reference-pixel integration time to an initial reference signal, where the initial reference signal has an initial reference-signal intensity. The method further includes correlating the electrical charges collected with the at least one object pixel over the initial object-pixel integration time to an initial object signal, where the initial object signal has an initial object-signal intensity. The method further includes determining an optimal reference pixel integration time and an optimal object pixel integration time from the initial reference signal and the initial object signal. The method further includes collecting electrical charges with the at least one reference pixel over the optimal reference pixel integration time, and collecting electrical charges with the at least one object pixel over the optimal object pixel integration time. The method further includes correlating the electrical charges collected with the at least one reference pixel over the optimal reference pixel integration time to an optimal reference signal, correlating the electrical charges collected with the at least one object pixel over the optimal integration time to an optimal object signal, and determining distance data from the optimal reference signal and the optimal object signal.

The method can further include, in some implementations, determining a calculated reference-pixel-integration time, and determining a calculated object-pixel-integration time. Such implementations can include comparing the calculated reference-pixel-integration time to a pre-established minimum integration time and a pre-established maximum integration time, and comparing the calculated object-pixel-integration time to the pre-established minimum integration time and the pre-established maximum integration time. Such implementations can include equating the optimal reference-pixel-integration time to the calculated reference-pixel-integration time or the calculated object-pixel-integration time, and equating the optimal object-pixel-integration time to the calculated object-pixel-integration time.

The method can further include, in some implementations, equating the optimal reference pixel integration time to the calculated reference pixel integration time for calculated reference pixel integration times less than the pre-establish minimum integration time and greater than the pre-established maximum integration time.

The method can further include, in some implementations, equating the optimal reference pixel integration time to the calculated object pixel integration time for calculated reference pixel integration times equal to or between the pre-establish minimum integration time and the pre-established maximum integration time.

The method can further include, in some implementations, comparing the initial reference-signal intensity to a pre-established reference-signal intensity threshold, and increasing the initial reference-pixel integration time for initial reference-signal intensities lower than the pre-established reference-signal intensity threshold. Such implementations can include decreasing the initial reference-pixel integration time for initial reference-signal intensities greater than the pre-established reference-signal intensity threshold, and equating the initial reference-pixel integration time to the calculated-reference-pixel-integration time.

The method can further include, in some implementations, comparing the initial object signal intensity to a pre-established object-signal intensity threshold, and increasing the initial object-pixel integration time for initial object signal intensities lower than the pre-established object-signal intensity threshold. Such implementations can further include decreasing the initial object-pixel integration time for initial object signal intensities greater than the pre-established object-signal intensity threshold, and equating the initial object-pixel integration time to the calculated-object-pixel-integration time.

The method can further include, in some implementations, equating the initial reference-signal intensity to an initial reference-signal signal-to-noise ratio, and equating the initial object-signal intensity to an initial object-signal signal-to-noise ratio. Such implementations can include equating the pre-established reference-signal intensity threshold to a pre-established reference-signal signal-to-noise threshold.

The method can further include, in some implementations, equating the initial reference-signal intensity to an initial reference-signal signal-to-noise ratio, equating the initial object-signal intensity to an initial object-signal signal-to-noise ratio, and equating the pre-established object-signal intensity threshold to a pre-established object-signal signal-to-noise threshold.

The method can further include, in some implementations, collecting electrical charges with the at least one reference pixel over an initial reference-pixel integration time, and collecting electrical charges with the at least one object pixel over an initial object-pixel integration time being initiated simultaneously.

The method can further include, in some implementations, collecting electrical charges with the at least one reference pixel over the optimal reference pixel integration time, and collecting electrical charges with the at least one object pixel over the optimal object pixel integration time being initiated simultaneously.

The method can further include, in some implementations, modulating the incident light with a particular modulation frequency.

In some implementations, at least one reference pixel is operable as a demodulation pixel and at least one object pixel is operable as a demodulation pixel.

The method can further include, in some implementations, determining distance data by the indirect time-of-flight technique In some cases, the method includes equating the optimal reference pixel integration time to the calculated reference pixel integration time for calculated reference pixel integration times less than the pre-establish minimum integration time and greater than the pre-established maximum integration time.

In some cases, the method includes equating the optimal reference pixel integration time to the calculated object pixel integration time for calculated reference pixel integration times equal to or between the pre-establish minimum integration time and the pre-established maximum integration time.

In some cases, the method includes comparing the initial reference-signal intensity to a pre-established reference-signal intensity threshold, and increasing the initial reference-pixel integration time for initial reference-signal intensities lower than the pre-established reference-signal intensity threshold. Such implementations can further include decreasing the initial reference-pixel integration time for initial reference-signal intensities greater than the pre-established reference-signal intensity threshold, and equating the initial reference-pixel integration time to the calculated-reference-pixel-integration time. Such implementations can further include comparing the initial object signal intensity to a pre-established object-signal intensity threshold, and increasing the initial object-pixel integration time for initial object signal intensities lower than the pre-established object-signal intensity threshold. Such implementations can further include decreasing the initial object-pixel integration time for initial object signal intensities greater than the pre-established object-signal intensity threshold, and equating the initial object-pixel integration time to the calculated-object-pixel-integration time.

In some instances, the method includes equating the initial reference-signal intensity to an initial reference-signal signal-to-noise ratio, equating the initial object-signal intensity to an initial object-signal signal-to-noise ratio, and equating the pre-established reference-signal intensity threshold to a pre-established reference-signal signal-to-noise threshold. Such implementations can further include equating the initial reference-signal intensity to an initial reference-signal signal-to-noise ratio, equating the initial object-signal intensity to an initial object-signal signal-to-noise ratio, and equating the pre-established object-signal intensity threshold to a pre-established object-signal signal-to-noise threshold. Such implementations can further include collecting electrical charges with the at least one reference pixel over an initial reference-pixel integration time, and collecting electrical charges with the at least one object pixel over an initial object-pixel integration time being initiated simultaneously. Such implementations can further include collecting electrical charges with the at least one reference pixel over the optimal reference pixel integration time, and collecting electrical charges with the at least one object pixel over the optimal object pixel integration time being initiated simultaneously.

Some implementations provide one or more of the following advantages. For example, some implementations can provide for highly accurate distance data. Further, some implementations can provide for optimized integration times rapidly such that accurate distance data can be collected rapidly, in real-time or near real-time for example.

Other aspects, features and advantages will be readily apparent from the following detailed description, the accompanying drawings, and the claims.

DETAILED DESCRIPTION

Figure 1:
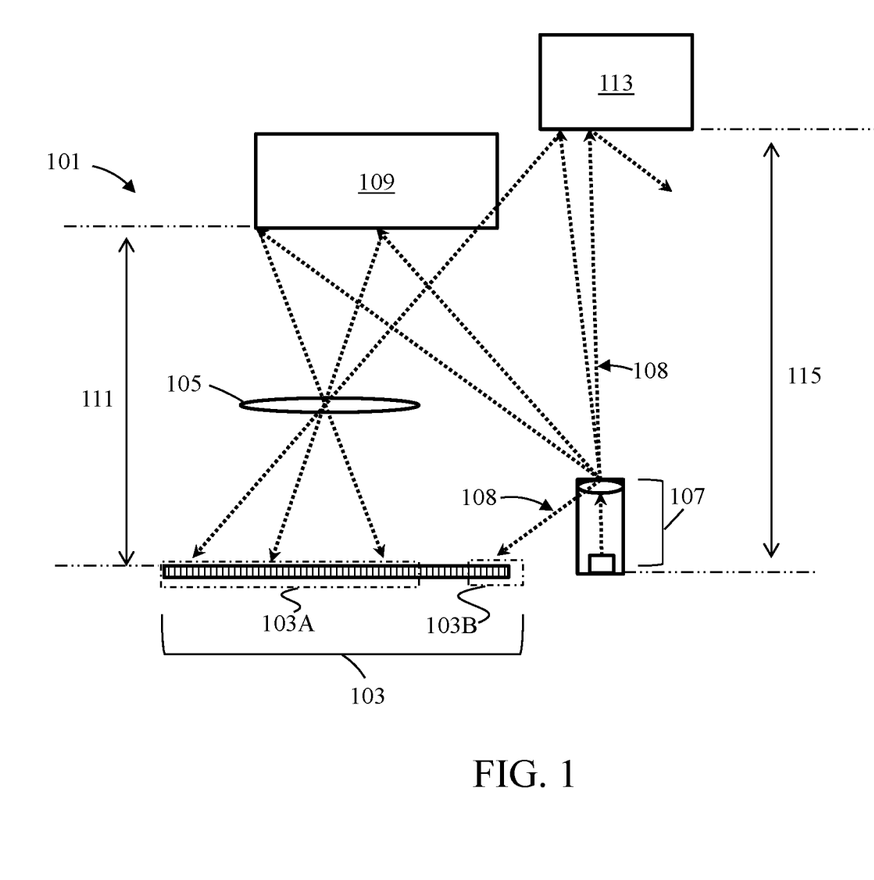
FIG. 1 depicts an example of an optical ranging system operable to generate distance data.

FIG. 1 depicts an example of an optical ranging system 101 operable to generate distance data. The optical ranging system 101 includes a multitude of pixels 103. The pixels can include at least one object pixel 103A and at least one reference pixel 103B. The pixels can be operable to collect incident light and generate distance data via the time-of-flight technique. The optical ranging system 101 further includes an optical assembly 105 and an illumination module 107. The illumination module 107 can direct light 108 onto one or more objects in a scene at a distance from the optical ranging system 101. For example, light can be directed onto an object 109 at a distance 111 and a second object 113 at a distance 115, for example, as illustrated in FIG. 1. A portion of the light directed from the illumination module 107 is reflected from the objects 109, 113 to the pixels 103, particularly the at least one object pixel 103A. Then the at least one object pixel collects the light over an object-pixel integration time, generating charge carriers, and subsequently an object signal having a signal-to-noise ratio.

Moreover, the illumination module 107 can direct light 108 onto one or more reference pixels 103B directly while directing light simultaneously from the illumination source onto the one or more objects in the scene. Then the at least one reference pixel collects the light over a reference-pixel integration time, generating charge carriers, and subsequently a reference signal having a signal-to-noise ratio. Distance data can be generated using object-pixel integration times and reference pixel integration times determined according to the example methods disclosed below and illustrated in FIG. 2 and FIG. 3A-FIG. 3E.

Figure 2:
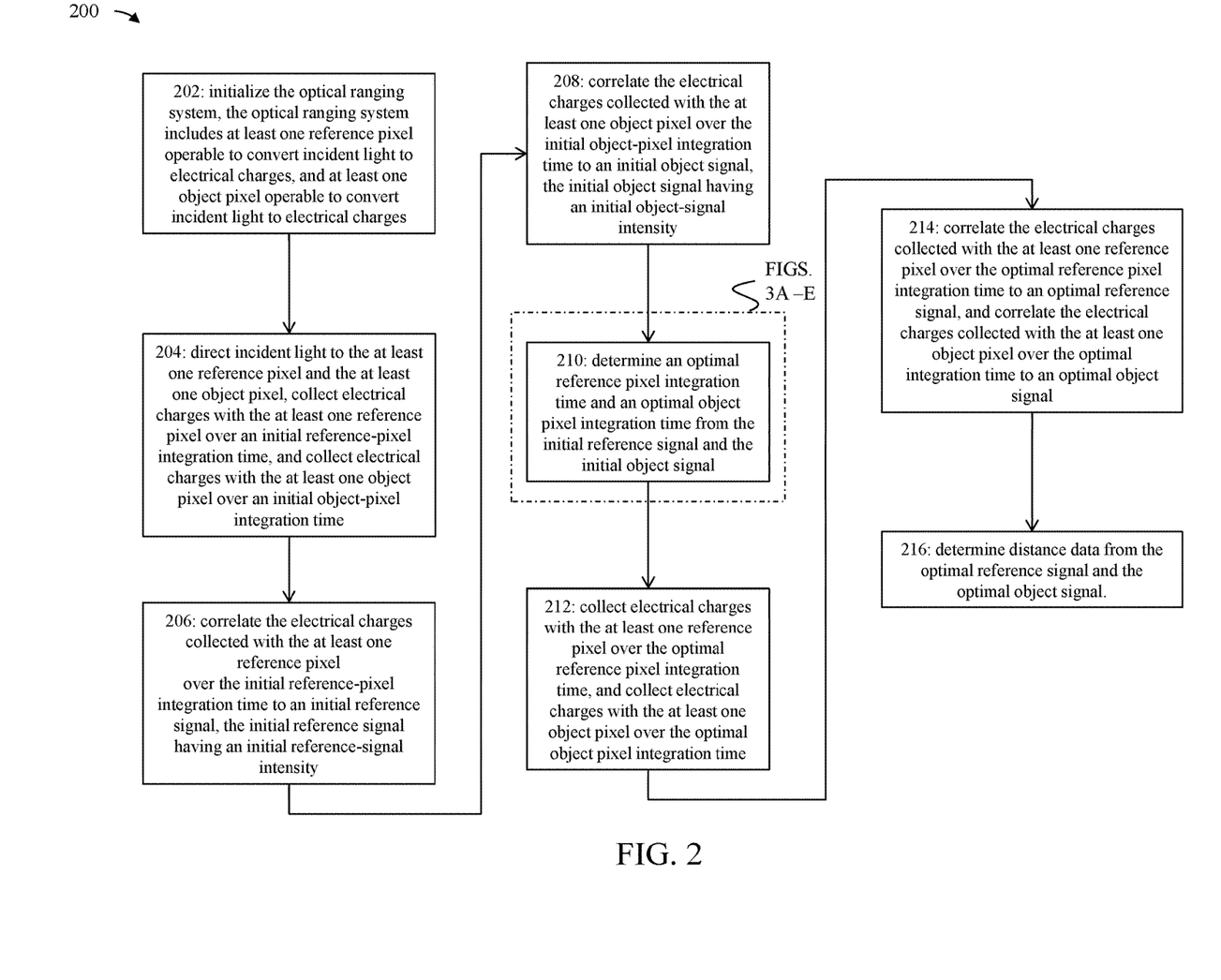
FIG. 2 is a flow chart illustrating operations for executing methods for generating distance data.

FIG. 2 is a flow chart illustrating operations 200 for executing methods for generating distance data. In 202, the example optical ranging system 101 is initialized, wherein the optical ranging system and its components are prepared to collect distance data. In some instances, the pixels are prepared for a measurement by being reset; for example, charge carriers can be drained out of each pixel. In 204 light is directed to the at least one object pixel 103A, being first reflected from one or more objects in a scene, and the at least one reference pixel 103B. Electrical charges are collected with the at least one reference pixel 103B over an initial reference-pixel integration time, and electrical charges are collected with the at least one object pixel 103A over an initial object-pixel integration time. In 206, the electrical charges collected with the at least one reference pixel 103B over the initial reference-pixel integration time are correlated to an initial reference signal, where the initial reference signal has an initial reference-signal intensity. In 208, the electrical charges collected with the at least one object pixel 103A over the initial object-pixel integration time are correlated to an initial object signal, where the initial object signal has an initial object-signal intensity. In 210, an optimal reference pixel integration time and an optimal object pixel integration time are determined from the initial reference signal and the initial object signal according to, in some instances, the operations described below and illustrated in FIG. 3A-FIG. 3E. In 212, electrical charges are collected with the at least one reference pixel 103B over the optimal reference pixel integration time, and electrical charges are collected with the at least one object pixel 103A over the optimal object pixel integration time. In 214, the electrical charges collected with the at least one reference pixel 103B over the optimal reference pixel integration time are correlated to an optimal reference signal, and the electrical charges collected with the at least one object pixel 103A over the optimal integration time are correlated to an optimal object signal according to, in some instances, the operations described below and illustrated in FIG. 3A-FIG. 3E. In 216, distance data from the optimal reference signal and the optimal object signal are determined, in some instances, according to the operations described below and illustrated in FIG. 3A-FIG. 3E.

Figures 3A, 3B, 3D:
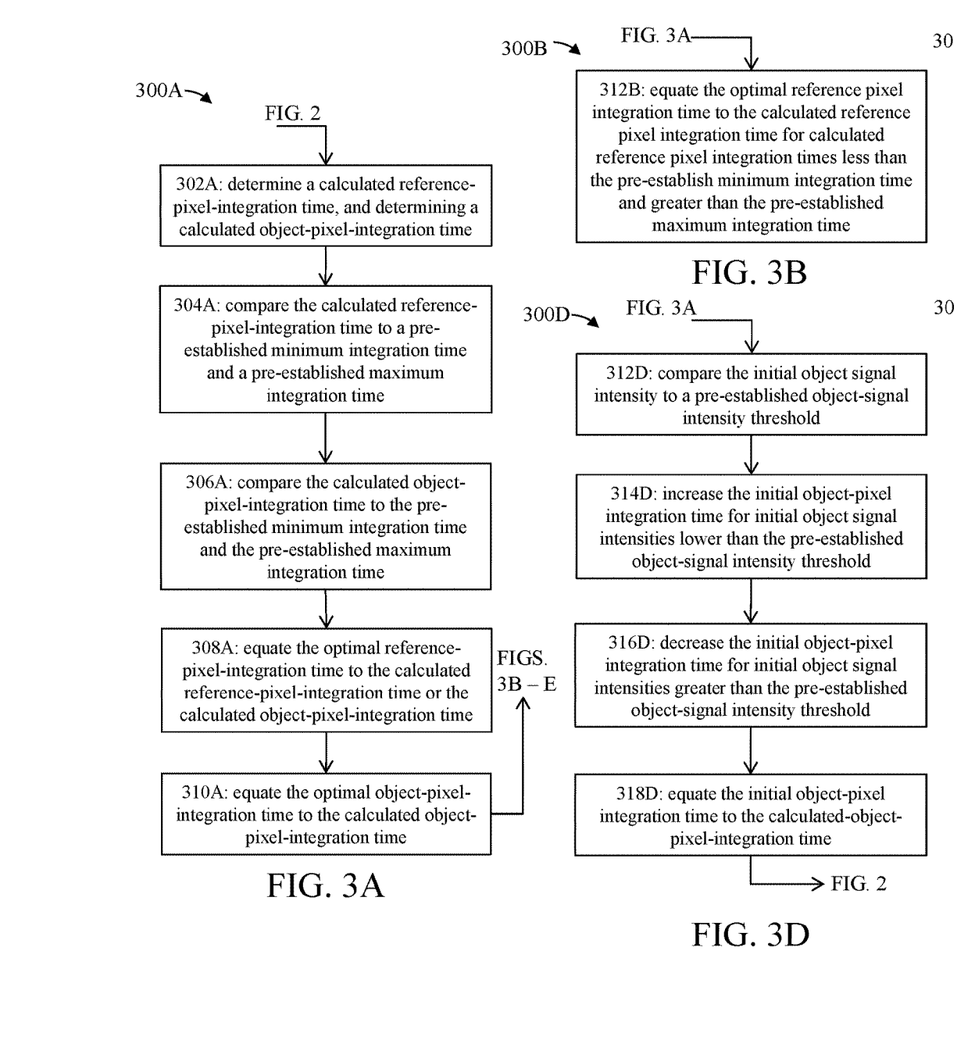
FIG. 3A is a flow chart illustrating operations for executing methods for determining optimal reference-pixel and object-pixel integration times.
FIG. 3B is another flow chart illustrating operations for executing methods for determining optimal reference-pixel and object-pixel integration times.
FIG. 3D is another flow chart illustrating operations for executing methods for determining optimal reference-pixel and object-pixel integration times.

FIG. 3A is a flow chart illustrating operations 300A for executing methods for determining optimal reference-pixel and object-pixel integration times. The optimal reference-pixel and object-pixel integration time determined according to the operations 300A can, in some instances, be implemented in the example methods described above and illustrated in FIG. 2. In 302A, a calculated reference-pixel-integration time is determined according to, in some instances, the steps described below and illustrated in FIG. 3A-FIG. 3E, and a calculated object-pixel-integration time is determined according to, in some instances, the steps described below and illustrated in FIG. 3A-FIG. 3E. In 304A, the calculated reference-pixel-integration time is compared to a pre-established minimum integration time and a pre-established maximum integration time. In 306A, the calculated object-pixel-integration time is compared to the pre-established minimum integration time and the pre-established maximum integration time. In 308A, the optimal reference-pixel-integration time is equated to the calculated reference-pixel-integration time or the calculated object-pixel-integration time for the example scenarios described below and illustrated in FIG. 3B-FIG. 3E. In 310A, the optimal object-pixel-integration time is equated to the calculated object-pixel-integration time for the example scenarios described below and illustrated in FIG. 3B-FIG. 3E.

Figure 3C:
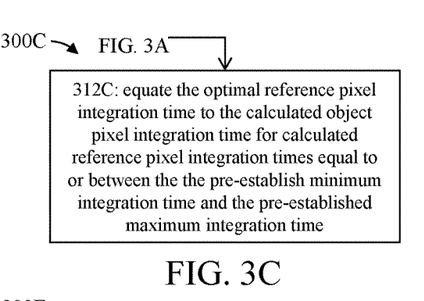
FIG. 3C is still another flow chart illustrating operations for executing methods for determining optimal reference-pixel and object-pixel integration times.

FIG. 3B is a flow chart illustrating operations 300B for executing methods for determining optimal reference-pixel and object-pixel integration times. The optimal reference-pixel and object-pixel integration time determined according to the operations 300B can be implemented in the example methods described above and illustrated in FIG. 2 and FIG. 3A. In 312B, the optimal reference pixel integration time is equated to the calculated reference pixel integration time for calculated reference pixel integration times less than the pre-establish minimum integration time and greater than the pre-established maximum integration time FIG. 3C is a flow chart illustrating operations 300C for executing methods for determining optimal reference-pixel and object-pixel integration times. The optimal reference-pixel and object-pixel integration time determined according to the operations 300C can be implemented in the example methods described above and illustrated in FIG. 2, FIG. 3A, and FIG. 3B. In 312C, the optimal reference pixel integration time is equated to the calculated object pixel integration time for calculated reference pixel integration times equal to or between the pre-establish minimum integration time and the pre-established maximum integration time.

FIG. 3D is a flow chart illustrating operations 300D for executing methods for determining optimal reference-pixel and object-pixel integration times. The optimal reference-pixel and object-pixel integration time determined according to the operations 300D can be implemented in the example methods described above and illustrated in FIG. 2 and FIG. 3A-FIG. 3C. In 312D, the initial object signal intensity is compared to a pre-established object-signal intensity threshold. In 314D, the initial object-pixel integration time is increased for initial object signal intensities lower than the pre-established object-signal intensity threshold. In 316D, the initial object-pixel integration time is decreased for initial object signal intensities greater than the pre-established object-signal intensity threshold. In 318D, the initial object-pixel integration time is equated to the calculated-object-pixel-integration time.

Figure 3E:
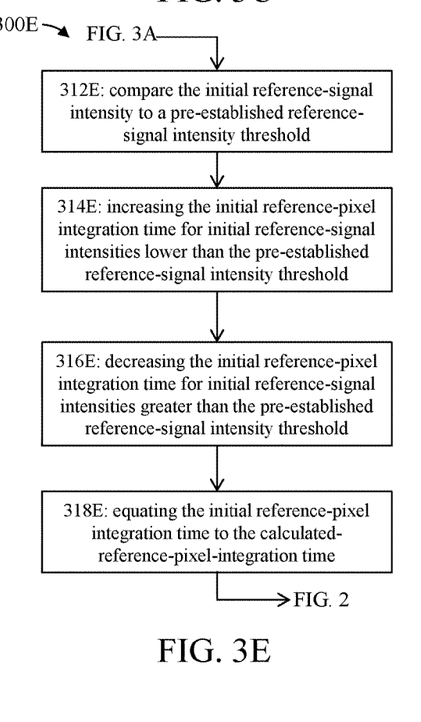
FIG. 3E is still another flow chart illustrating operations for executing methods for determining optimal reference-pixel and object-pixel integration times.

FIG. 3E is a flow chart illustrating operations 300E for executing methods for determining optimal reference-pixel and object-pixel integration times. The optimal reference-pixel and object-pixel integration time determined according to the operations 300E can be implemented in the example methods described above and illustrated in FIG. 2 and FIG. 3A-FIG. 3D. In 312E, the initial reference-signal intensity is compared to a pre-established reference-signal intensity threshold. In 314E, the initial reference-pixel integration time is increased for initial reference-signal intensities lower than the pre-established reference-signal intensity threshold. In 316E, the initial reference-pixel integration time is decreased for initial reference-signal intensities greater than the pre-established reference-signal intensity threshold. In 318, the initial reference-pixel integration time is equated to the calculated-reference-pixel-integration time.

The aforementioned examples and implementations describe and illustrate a series of operations in an example method for generating distance data with an optical ranging system. Various operations are described as occurring sequentially. For example, incident light is directed onto one or more objects, light is collected with an integration time, a new integration time is determined, light is directed onto the one or more objects again, and light is collected with the newly determined integration time. The operations, however, need not occur sequentially. Such operations can occur simultaneously or near simultaneously. For, example, in some instance while the aforementioned operations are executed light may be continuously directed onto the one or more objects in the scene as other operations are simultaneously execute. Moreover, while the operations have been described in a particular order, they need not occur in that particular order. Moreover, the example operations described above can be repeated such that the optimal object-pixel integration time and the optimal reference-pixel integration time produce acceptable signal-to-noise ratios.

Further, the optical ranging system describe above can include other components necessary to implement the example methods described above. For example, the optical ranging system can include power sources, processors, circuitry, drivers, firmware, software, bandpass filters, and so on as would be apparent to a person of ordinary skill in the art. Other modifications may be made to the foregoing implementations, and features described above in different implementations may be combined in the same implementations. Thus, other implementations are within the scope of the claims.

What is claimed is:

1. A method for collecting distance data with an optical ranging system, the method comprising:
    initializing the optical ranging system, the optical ranging system including at least one reference pixel operable to convert incident light to electrical charges, and at least one object pixel operable to convert incident light to electrical charges;
    directing incident light to the at least one reference pixel and the at least one object pixel, collecting electrical charges with the at least one reference pixel over an initial reference-pixel integration time, and collecting electrical charges with the at least one object pixel over an initial object-pixel integration time;
    correlating the electrical charges collected with the at least one reference pixel over the initial reference-pixel integration time to an initial reference signal having an initial reference signal intensity;
    correlating the electrical charges collected with the at least one object pixel over the initial object-pixel integration time to an initial object signal having an initial object-signal intensity;
    determining an optimal reference pixel integration time and an optimal object pixel integration time from the initial reference signal and the initial object signal;
    collecting electrical charges with the at least one reference pixel over the optimal reference pixel integration time, and collecting electrical charges with the at least one object pixel over the optimal object pixel integration time;
    correlating the electrical charges collected with the at least one reference pixel over the optimal reference pixel integration time to an optimal reference signal, and correlating the electrical charges collected with the at least one object pixel over the optimal object pixel integration time to an optimal object signal; and
    determining distance data from the optimal reference signal and the optimal object signal,
    wherein determining the optimal reference-pixel-integration time and the optimal object-pixel-integration time from the initial reference signal and the initial object signal further includes:
        determining a calculated reference-pixel-integration time, and determining a calculated object-pixel-integration time;
        comparing the calculated reference-pixel-integration time to a pre-established minimum integration time and a pre-established maximum integration time;
        comparing the calculated object-pixel-integration time to the pre-established minimum integration time and the pre-established maximum integration time;
        equating the optimal reference-pixel-integration time to the calculated reference-pixel-integration time or the calculated object-pixel-integration time; and
        equating the optimal object-pixel-integration time to the calculated object-pixel-integration time; and
    wherein determining the calculated-reference-pixel-integration time further includes:
        comparing the initial reference-signal intensity to a pre-established reference-signal intensity threshold;
        increasing the initial reference-pixel integration time for initial reference-signal intensities lower than the pre-established reference-signal intensity threshold;

decreasing the initial reference-pixel integration time for initial reference-signal intensities greater than the pre-established reference-signal intensity threshold; and equating the initial reference-pixel integration time to the calculated-reference-pixel-integration time.

2. The method according to claim 1, further including equating the optimal reference pixel integration time to the calculated reference pixel integration time for calculated reference pixel integration times less than the pre-established minimum integration time and greater than the pre-established maximum integration time.

3. The method according to claim 1, further including equating the optimal reference pixel integration time to the calculated object pixel integration time for calculated reference pixel integration times equal to or between the pre-established minimum integration time and the pre-established maximum integration time.

4. The method according to claim 1, wherein determining the calculated-object-pixel-integration time further includes:
comparing the initial object signal intensity to a pre-established object-signal intensity threshold;
increasing the initial object-pixel integration time for initial object signal intensities lower than the pre-established object-signal intensity threshold;
decreasing the initial object-pixel integration time for initial object signal intensities greater than the pre-established object-signal intensity threshold; and
equating the initial object-pixel integration time to the calculated-object-pixel-integration time.

5. The method according to claim 1, further including:
equating the initial reference-signal intensity to an initial reference-signal signal-to-noise ratio;
equating the initial object-signal intensity to an initial object-signal signal-to-noise ratio; and
equating the pre-established reference-signal intensity threshold to a pre-stablished reference-signal signal-to-noise threshold.

6. The method according to claim 4, further including:
equating the initial reference-signal intensity to an initial reference-signal signal-to-noise ratio;
equating the initial object-signal intensity to an initial object-signal signal-to-noise ratio; and
equating the pre-established object-signal intensity threshold to a pre-established object-signal signal-to-noise threshold.

7. The method according to claim 1, wherein collecting electrical charges with the at least one reference pixel over an initial reference-pixel integration time, and collecting electrical charges with the at least one object pixel over an initial object-pixel integration time are initiated simultaneously.

8. The method according to claim 7, wherein collecting electrical charges with the at least one reference pixel over the optimal reference pixel integration time, and collecting electrical charges with the at least one object pixel over the optimal object pixel integration time are initiated simultaneously.

9. The method according to claim 1, wherein directing incident light to the at least one reference pixel and the at least one object pixel includes modulating the incident light with a particular modulation frequency.

10. The method according to claim 9, wherein at least one reference pixel is a demodulation pixel and at least one object pixel is a demodulation pixel.

11. The method according to claim 10, wherein determining distance data from the optimal reference signal and the optimal object signal includes determining distance data by the indirect time-of-flight technique.

12. The method according to claim 11, further including equating the optimal reference pixel integration time to the calculated reference pixel integration time for calculated reference pixel integration times less than the pre-established minimum integration time and greater than the pre-established maximum integration time.

13. The method according to claim 11, further including equating the optimal reference pixel integration time to the calculated object pixel integration time for calculated reference pixel integration times equal to or between the pre-established minimum integration time and the pre-established maximum integration time.

14. The method according to claim 11, wherein:
collecting electrical charges with the at least one reference pixel over an initial reference-pixel integration time, and collecting electrical charges with the at least one object pixel over an initial object-pixel integration time are initiated simultaneously; and
collecting electrical charges with the at least one reference pixel over the optimal reference pixel integration time, and collecting electrical charges with the at least one object pixel over the optimal object pixel integration time are initiated simultaneously.

15. A method for collecting distance data with an optical ranging system, the method comprising:
initializing the optical ranging system, the optical ranging system including at least one reference pixel operable to convert incident light to electrical charges, and at least one object pixel operable to convert incident light to electrical charges;
directing incident light to the at least one reference pixel and the at least one object pixel, collecting electrical charges with the at least one reference pixel over an initial reference-pixel integration time, and collecting electrical charges with the at least one object pixel over an initial object-pixel integration time;
correlating the electrical charges collected with the at least one reference pixel over the initial reference-pixel integration time to an initial reference signal having an initial reference-signal intensity;
correlating the electrical charges collected with the at least one object pixel over the initial object-pixel integration time to an initial object signal having an initial object-signal intensity;
determining an optimal reference pixel integration time and an optimal object pixel integration time from the initial reference signal and the initial object signal;
collecting electrical charges with the at least one reference pixel over the optimal reference pixel integration time, and collecting electrical charges with the at least one object pixel over the optimal object pixel integration time;
correlating the electrical charges collected with the at least one reference pixel over the optimal reference pixel integration time to an optimal reference signal, and correlating the electrical charges collected with the at least one object pixel over the optimal object pixel integration time to an optimal object signal; and
determining distance data from the optimal reference signal and the optimal object signal;
wherein determining the optimal reference-pixel-integration time and the optimal object-pixel-integration time from the initial reference signal and the initial object signal further includes determining a calculated reference-pixel-integration time, and determining a calculated object-pixel-integration time,
comparing the calculated reference-pixel-integration time to a pre-established minimum integration time and a pre-established maximum integration time,
comparing the calculated object-pixel-integration time to the pre-established minimum integration time and the pre-established maximum integration time,
equating the optimal reference-pixel-integration time to the calculated reference-pixel-integration time or the calculated object-pixel-integration time, and
equating the optimal object-pixel-integration time to the calculated object-pixel-integration time; and
wherein determining the calculated-object-pixel-integration time further includes
comparing the initial object signal intensity to a pre-established object-signal intensity threshold,
increasing the initial object-pixel integration time for initial object signal intensities lower than the pre-established object-signal intensity threshold,
decreasing the initial object-pixel integration time for initial object signal intensities greater than the pre-established object-signal intensity threshold, and
equating the initial object-pixel integration time to the calculated-object-pixel-integration time.

16. The method according to claim 15, further including equating the initial reference-signal intensity to an initial reference-signal signal-to-noise ratio, equating the initial object-signal intensity to an initial object-signal signal-to-noise ratio, and equating the pre-established object-signal intensity threshold to a pre-established object-signal signal-to-noise threshold.

17. The method according to claim 15, wherein determining the calculated-reference-pixel-integration time further includes comparing the initial reference-signal intensity to a pre-established reference-signal intensity threshold, increasing the initial reference-pixel integration time for initial reference-signal intensities lower than the pre-established reference-signal intensity threshold, decreasing the initial reference-pixel integration time for initial reference-signal intensities greater than the pre-established reference-signal intensity threshold, and equating the initial reference-pixel integration time to the calculated-reference-pixel-integration time.

18. The method according to claim 17, further including equating the initial reference-signal intensity to an initial reference-signal signal-to-noise ratio, equating the initial object-signal intensity to an initial object-signal signal-to-noise ratio, and equating the pre-established reference-signal intensity threshold to a pre-stablished reference-signal signal-to-noise threshold.

19. The method according to claim 15, wherein collecting electrical charges with the at least one reference pixel over an initial reference-pixel integration time, and collecting electrical charges with the at least one object pixel over an initial object-pixel integration time are initiated simultaneously.

* * * * *